United States Patent
West et al.

(10) Patent No.: US 6,495,168 B2
(45) Date of Patent: Dec. 17, 2002

(54) NUTRITIONAL SUPPLEMENTS FORMULATED FROM BIOACTIVE MATERIALS

(75) Inventors: Jon K. West, Gainesville, FL (US); David Greenspan, Gainesville, FL (US); James L. Meyers, Gainesville, FL (US)

(73) Assignees: USTherapeutics, LLC, Alachua, FL (US); USBiomaterials Corporation, Alachua, FL (US)

(*) Notice: Subject to any disclaimer, the term of this patent is extended or adjusted under 35 U.S.C. 154(b) by 14 days.

(21) Appl. No.: 09/817,831

(22) Filed: Mar. 26, 2001

(65) Prior Publication Data

US 2001/0041192 A1 Nov. 15, 2001

Related U.S. Application Data

(60) Provisional application No. 60/192,088, filed on Mar. 24, 2000.

(51) Int. Cl.[7] .................. A61K 33/00; A61K 33/08; A61K 33/16; A61K 33/22; A61K 33/42
(52) U.S. Cl. ............... 424/602; 424/438; 424/439; 424/441; 424/442; 424/489; 424/600; 424/601; 424/606; 424/639; 424/641; 424/657; 424/675; 424/683; 424/688; 424/692; 424/722; 424/724; 426/2; 426/74; 426/648; 514/905
(58) Field of Search ................. 424/438, 439, 424/441, 442, 489, 600–602, 606, 639, 641, 657, 675, 683, 688, 692, 722, 724; 426/2, 74, 648; 514/905

(56) References Cited

U.S. PATENT DOCUMENTS

| | | | |
|---|---|---|---|
| 3,946,115 A | 3/1976 | Brever et al. ............ 426/72 |
| 3,981,736 A | 9/1976 | Broemer et al. ............ 501/10 |
| 4,131,597 A | 12/1978 | Bliiethgen et al. ........... 523/114 |
| 4,166,867 A | 9/1979 | Betz et al. ............... 426/73 |
| 4,197,319 A | 4/1980 | Betz et al. ................ 426/2 |
| 4,197,320 A | 4/1980 | Betz et al. ................ 426/2 |
| 4,230,736 A | 10/1980 | Betz et al. ............... 426/601 |
| 4,309,488 A | 1/1982 | Heide et al. .............. 428/547 |
| 4,478,904 A | 10/1984 | Ducheyne et al. ........ 428/294.4 |
| 4,482,541 A * | 11/1984 | Telfer et al. .............. 424/128 |
| 4,515,780 A | 5/1985 | Laurent et al. ............ 424/684 |
| 4,556,564 A | 12/1985 | Laurent et al. ............. 426/2 |
| 4,610,883 A | 9/1986 | Laurent et al. ............ 424/684 |
| 4,613,516 A | 9/1986 | Kucheria et al. .......... 427/2.27 |
| 4,676,796 A | 6/1987 | Merwin et al. ............ 623/10 |
| 4,775,646 A | 10/1988 | Hench et al. .............. 501/2 |
| 4,851,046 A | 7/1989 | Low et al. ................ 106/35 |
| 5,068,122 A | 11/1991 | Kokubo et al. ............. 427/2.1 |
| 5,074,916 A | 12/1991 | Hench et al. .............. 106/35 |
| 5,420,081 A | 5/1995 | Mattes et al. .............. 501/12 |
| 5,429,996 A | 7/1995 | Kaneko ................... 501/35 |
| 5,458,636 A | 10/1995 | Brancato ............... 623/23.72 |
| 5,468,544 A | 11/1995 | Marcolongo et al. ....... 442/187 |
| 5,480,438 A | 1/1996 | Ariam et al. ............ 623/23.6 |
| 5,486,598 A | 1/1996 | West et al. ............... 530/338 |
| 5,496,374 A | 3/1996 | Blanchard et al. .......... 424/423 |
| 5,527,836 A | 6/1996 | Yamamuro et al. ......... 523/116 |
| 5,554,501 A | 9/1996 | Coassin et al. ............. 435/6 |
| 5,573,934 A | 11/1996 | Hubbell et al. ............ 435/177 |
| 5,605,713 A | 2/1997 | Boltong .................. 427/2.1 |
| 5,629,186 A | 5/1997 | Yasukawa et al. .......... 435/177 |
| 5,643,789 A | 7/1997 | Ducheyne et al. .......... 435/357 |
| 5,645,934 A | 7/1997 | Marcolongo et al. ....... 428/357 |
| 5,676,720 A | 10/1997 | Ducheyne et al. .......... 65/17.5 |
| 5,698,019 A | 12/1997 | Frank et al. .............. 106/35 |
| 5,721,049 A | 2/1998 | Marcolongo et al. ....... 428/370 |
| 5,728,753 A | 3/1998 | Bonfield et al. ........... 523/114 |
| 5,735,942 A | 4/1998 | Litkowski et al. ........... 106/35 |
| 5,762,950 A | 6/1998 | Yli-Urpo et al. ........... 424/422 |
| 5,830,480 A | 11/1998 | Ducheyne et al. .......... 424/400 |
| 5,834,008 A | 11/1998 | Greenspan et al. ........ 424/443 |
| 5,840,290 A | 11/1998 | Hench et al. .............. 424/423 |
| 5,861,176 A | 1/1999 | Ducheyne et al. .......... 424/486 |
| 5,871,777 A | 2/1999 | Ducheyne et al. .......... 424/486 |
| 5,874,101 A | 2/1999 | Zhong et al. .............. 424/426 |
| 5,879,109 A | 3/1999 | Finzel et al. .............. 405/174 |
| 5,891,233 A | 4/1999 | Salonen et al. ............. 106/35 |
| 5,934,287 A | 8/1999 | Hayashi et al. ............ 128/898 |
| 5,962,549 A | 10/1999 | Bonfield et al. ........... 523/113 |
| 5,964,745 A | 10/1999 | Lyles et al. .............. 604/891.1 |
| 5,972,384 A | 10/1999 | Thut et al. ................ 424/484 |
| 5,977,204 A | 11/1999 | Boyan et al. .............. 523/113 |
| 5,981,412 A | 11/1999 | Hench et al. ............... 501/5 |
| 6,010,713 A | 1/2000 | Zhong et al. .............. 424/426 |
| 6,017,496 A | 1/2000 | Nova et al. ............... 422/68.1 |
| 6,027,742 A | 2/2000 | Lee et al. ................. 424/422 |
| 6,036,984 A | 3/2000 | Sartorio et al. ............ 426/72 |
| 2002/0086039 A1 * | 7/2002 | Lee et al. ................. 424/401 |

FOREIGN PATENT DOCUMENTS

| | | |
|---|---|---|
| EP | 0126310 | 11/1984 |
| EP | 0147932 | 7/1985 |
| EP | 0192222 | 8/1986 |
| WO | 9817236 | 4/1998 |
| WO | 0015167 | 3/2000 |
| WO | 0066086 | 11/2000 |

OTHER PUBLICATIONS

Carlisle, Edith M. (1970) "Silicon: A Possible Factor in Bond Calcification" *Science* 167:279–280.

Carlisle, E. M. (1976) "In vivo Requirement for Silicon in Articular Cartilage and Connective Tissue Formation in the Chick" *J. Nutr.* 106:478–484.

(List continued on next page.)

*Primary Examiner*—John Pak
(74) *Attorney, Agent, or Firm*—Saliwanchik, Lloyd & Saliwanchik

(57) ABSTRACT

This invention relates, generally, to nutritional supplements which contain bioactive glass. These supplements are useful in both veterinary and human contexts. The compositions of the subject invention can be used to achieve a number of advantageous results including: enhancing the growth rates of young animals, osteogenic stimulation, strengthening the skeletal structure, and treating osteoporosis.

15 Claims, 2 Drawing Sheets

OTHER PUBLICATIONS

Keeting, Philip E., Merry Jo Oursler, Karl E. Wiegand et al. (1992) "Zeolite A Increases Proliferation, Differentiation, and Transforming Growth Factor β Production in Normal Adult Human Osteoblast–like Cells In Vitro" *J. of Bone and Mineral Res.* 7(11):1281–1289, Mary Ann Liebert, Inc. publishers.

Miles, R.D., a. Rossi, G. Russell, R. H. Harms (Jan. 1986) "Performance of Laying Hens Fed Phosphorus From Precipitated Bone" *Nutritional Reports International* 33(1):99–104, 111.

Mumpton, F.A. and P.H. Fishman (1997) "The Application of Natural Zeolites in Animal Science and Aquaculture" *Journal of Animal Science* 45(5):1188–1203.

Nordin, B.E.C. (1985) "Calcium Deficiency and Postmenopausal Osteoporosis" *Lancet* 2:720.

Riggs, B. Lawrence, Heinz W. Wahner, L. Joseph Melton III et al. (May 1986) "Rates of Bone Loss in the Appendicular and Axial Skeletons of Women" *J. Clin. Invest.* 77:1487–1491.

Riggs, B. Lawrence (1988) "Osteoporosis" Cecil Textbook of Medicine, Id.pp. 14261431.

Roland, David A, Sr., S.M. Laurent, H.D. Orloff (1985) "Shell Quality as Influenced by Zeolite with High Ion–Exchange Capability" *Poultry Science* 64:1177–1187.

* cited by examiner

[a]Week 12 represents an 8-day interval; Week 13 represents a 6-day interval.

NUTRITIONAL SUPPLEMENTS FORMULATED FROM BIOACTIVE MATERIALS

CROSS-REFERENCE TO A RELATED APPLICATION

This application claims the benefit of U.S. Provisional Application No. 60/192,088, filed Mar. 24, 2000.

BACKGROUND OF THE INVENTION

In the 1970s, it was reported that silicon was an important trace element for the formation and mineralization of bone. Silicon was shown to localize to active calcification sites in bone in young mice and rats. Chickens and rats maintained on a silicon-deficient diet had impaired collagen synthesis and defective skeletal structure (Carlisle, Edith M. [1970] *Science* 167:279–280; Carlisle, E. M. [1976] *J. Nutr.* 106:478–484).

More recently, the proosteogenic properties of a class of silicon-containing compounds, the zeolites, have been studied. Zeolites have been employed widely as catalysts in the petrochemical industry and as components of detergents. They are composed of ($SiO_4$) and ($AlO_4$) tetranedra, which share oxygen-bridging vertices and form cage-like structures in crystalline form. The addition of a synthetic zeolite, sodium zeolite A, to chicken feed increased eggshell thickness and protected the eggs from breakage. As with bone, the process of eggshell formation involves the synthesis of a mineralizable matrix. Also, a single injection of zeolite A into incubating chicken eggs resulted in dose-dependent increases in diaphyseal cortical bone of the hatchling.

Over the years a wide variety of experiments have been conducted throughout the world utilizing zeolites of many different types in the feeding of animals for varying reasons. Most of these experiments have been in the fields of animal nutrition or animal husbandry, e.g. in increasing the production of food animals or their food products. Animals fed zeolites were poultry, cattle, sheep and swine. Zeolites fed to the animals were mainly naturally occurring zeolites.

Keeting et al. (Keeting, Philip E., Merry Jo Oursler, Karl E. Wiegand, Susan K. Bonde, Thomas C. Spelsberg, B. Lawrence Riggs [1992] *J. of Bone and Mineral Res.* 7(11), Mary Ann Liebert, Inc., Publishers) showed that silicon in trace amounts enhances bone formation, and the silicon-containing compound Zeolite A increases eggshell thickness in hens. Zeolite is a $SiO_4$—$AlO_4$ cage-like structure. Zeolite induces gene expression and release in the osteoblast-like cells of latent transforming growth factor (TGF-β). In many tissues, including bone, TGF-β is secreted as a latency complex containing one or more binding proteins.

Experiments conducted in Japan on the use of natural zeolite minerals as dietary supplements for poultry, swine and cattle reported significant increases in body weight per unit of feed consumed and in the general health of the animals; (Minato, Hideo, Koatsugasu 5:536, 1968). Reductions in malodor were also noted. Using clinoptilolite and mordenite from northern Japan, Onagi, T. (Rept. Yamagata Stock Raising Inst. 7, 1966) found that Leghorn chickens required less food and water and gained as much weight in a two-week trial as birds receiving a control diet. No adverse effects on health or mortality were noted. [F. A. Mumpton and P. H. Fishman, Journal of Animal Science, Vol. 45, No. 5 (1977), pp. 1188–1203].

Other studies indicate that zeolite A has a positive effect upon structural maintenance and strength of bone within six weeks of administration and that zeolite A in poultry diets causes a reduced incidence and severity of tibial dyschondroplasia (osteochondrosis) and enhanced absorption of $^{47}Ca$ [Edwards, Annual Meeting of the Poultry Science Assoc., North Carolina State University (1986)]. Research of Laurent et al has also resulted in the discoveries that zeolite A (i) decreases mortality in the rate of laying hens, U.S. Pat. No. 4,610,883 (incorporated by reference in its entirety); Roland et al, J. Poultry Sci., 64:1177 (1985), Miles et al, Nutrition Reports International (1986); (ii) increases quality of poultry eggshells, U.S. Pat. No. 4,556,564 (incorporated by reference in its entirety); (iii) and reduces heat stress. It has also been discovered that zeolite A inhibits kidney stones or urinary calculi in lambs [U.S. Pat. No. 4,515,780 (incorporated by reference in its entirety)].

Vitamins and minerals are necessary for normal metabolic functioning of both humans and animals. Vitamins are either fat-soluble or water-soluble. The use of vitamin and mineral supplements to compensate for deficiencies thereof in animals and humans due to age, poor eating habits or genetic defects is known in the art.

In particular, equine are known to suffer from a number of conditions related to vitamin and minerals deficiencies due to poor quality forage or hay, chronic colic, chronic diarrhea, or anorexia resulting from dental disease. In addition, there may also be disturbances in absorption as the result of liver or biliary tract disease, hypothyroidism, anemia and other pathological conditions of the digestive system and related organs. Numerous equine supplements are currently on the market.

A horse is generally feed-restricted or hand-fed at least twice per day due to its small stomach size relative to its large body mass. Feeding a horse in an unrestricted or "ad libitum" fashion often results in colic, founder, azoturia and other digestive related problems. To avoid such problems, even complete horse rations containing roughage must be carefully hand-fed. Manual feeding is often time consuming and costly, especially for owners of pleasure horses.

It is known in the art to produce horse feeds for high performance horses which have compositions exhibiting good palatability, improved digestibility and high carbohydrate content for increased energy. Such feeds are described in, for example, U.S. Pat. Nos. 3,946,115; 4,166,867; and 4,197,320 (hereby incorporated by reference in their entireties). These patents describe rations which are designed to supplement an existing diet. Dietary supplements have also been described for ruminants, e.g., in U.S. Pat. Nos. 4,197,319 and 4,230,736, hereby incorporated by reference in their entireties.

Osteoporosis is a metabolic bone disease characterized pathologically by an absolute decrease in the amount of bone, and clinically by increased susceptibility to fractures. Riggs et al., N. Engl. J. Med. (1986), 314:1676; Rusbach et al., In: Textbook of Endocrinology, Ed(s) Williams, (1981), p. 922; Riggs, In: Cecil Textbook of Medicine, Ed(s) Wyngaarden et al., (1985), p. 1456; Riggs et al., Am. J. Med., (1983), 75:899.

In post-menopausal women, estrogen deficiency has been identified as a major predisposing factor. Recent studies in normal women ages 20 to 88 years indicate, however, that substantial bone loss from the axial skeleton occurs gradually in the decades before estrogen deficiency ensues at menopause. Riggs et al., J. Clin. Invest., (1986), 77:1487. According to Riggs et al., " . . . factors in addition to estrogen deficiency must contribute to the pathogenesis of involutional osteoporosis in women because about half of overall vertebral bone loss occurs premenopausally."

Calcium deficiency is believed to be one of those additional factors. Riggs, In Cecil Textbook of Medicine, Id.; Nordin, (1985), Lancet 2:720; Fujita, (1986), 12:49; Heaney, In: Osteoporosis II Ed(s), Bonzel, (1979), p. 101; and Heaney, (1982), J. Lab. Clin. Med. 100:309. Three conditions, in turn, have been identified as predisposing to calcium deficiency: suboptimal calcium intake, subnormal intestinal calcium-absorptive ability and normal or above average protein intake, Heaney, In Osteoporosis II, Id.; Heaney et al., (1982), Am. J. Clin. Nutr. 36:986.

An increasing demand on body calcium stores is imposed by increasing dietary protein, which increases urinary excretion of calcium. Lutz, Id.; Schuette, et al., (1982), J. Nutr. 112:338; Lutz, et al., (1981), Am. J. Clin. Nutr., 34:2178; Hegsted, et al., (1981), J. Nutr. 111:553; Schuette, et al., (1980), J. Nutr. 110:305; Allen, et al., (1979), 32:741; and Margen, et al., (1974), Am. J. Clin: Nutr. 27:584. Intestinal absorption of calcium fails to increase commensurately with protein-induced calciuria, hence external calcium balance becomes negative. Lutz, Id.; Schuette, et al., (1982), Id. In combination, low dietary intake of calcium and high dietary intake of protein result in greater calcium deficiency than does either condition alone. Lutz, Id.; and Rekha, et al., 1974, J. Nutr. 104:695.

There remains a need for nutritional supplements for humans and other animals which can improve health. This improvement can be, for example, improved weight gain, bone strength, and/or, in the case of birds, improved shell strength of eggs.

BRIEF SUMMARY OF THE INVENTION

The subject invention provides materials and methods for improved nutrition. Specifically exemplified herein is the use of dietary or nutritional supplements which comprise bioactive glass. In a preferred embodiment, the bioactive glass is powdered. These supplements are useful in both veterinary and human contexts. Dietary supplements comprising a bioactive material, BIOGLASS® for example, are attractive dietary supplements for a variety of reasons. Advantageously, bioactive glass is much more soluble than zeolite compounds. Furthermore, bioactive glass is also capable of carrying nutrients to the desired target sites and many forms of the glass are resorbable.

One embodiment of the subject invention contemplates methods of enhancing the growth rates of young (not mature) animals by the administration of nutritional supplements containing powdered bioactive glass or the administration of feeds containing bioactive glass.

Another embodiment of the invention contemplates the osteogenic stimulation in animals by administration of nutritional supplements comprising powdered bioactive glass or the administration of feeds.

Another embodiment of the invention is drawn to methods of strengthening the skeletal structure of an animal comprising the administration of powdered bioactive glass to an animal through dietary supplements or the normal course of feeding.

The subject invention also contemplates novel methods for treating osteoporosis and, more particularly, involves the administration of pharmaceutically acceptable dietary or nutritional supplements comprising powdered bioactive glass. The powdered bioactive glass may also be incorporated into or added to meals and beverages. Pharmaceutical compositions comprising powdered bioactive glass and other nutritive or dietary supplements are also contemplated.

BRIEF DESCRIPTION OF THE DRAWINGS

FIGS. 1A–2B depicts the Mean Body Weights of animals during the course of a study. FIG. 1A depicts the weights of male animals.

FIGS. 2A–2B depicts Mean Food Consumption during the course of a study. FIG. 2A depicts the weights of male animals, FIG. 2B depicts the weights of female animals. Week 12 represents a 8-day interval and week 13 represents a 6-day interval on each of these figures.

DETAILED DISCLOSURE OF THE INVENTION

Figure 1A:
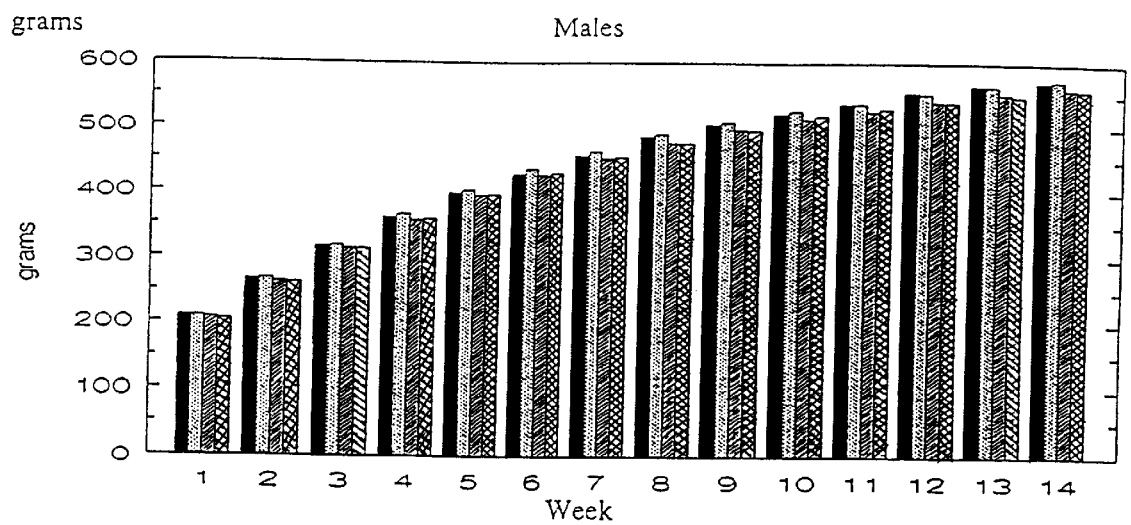

The subject invention provides dietary and nutritional supplements which comprise bioactive glass. These supplements are useful in both veterinary and human contexts. The terms dietary supplement(s) and nutritional supplement(s) are considered equivalent for the purposes of this invention and may be used interchangeably.

As used herein, the term "animal" includes organisms which are avian, mammalian, or reptilian. Mammalian species which benefit from the disclosed methods include, and are not limited to, apes, chimpanzees, humans, monkeys, domesticated animals such as cows, buffalo, bison, horses, sheep, goats, dogs, cats, bear, and pigs. Reptiles include, and are not limited to, alligators, crocodiles, turtles, tortoises, snakes, and lizards. Avian species include, and are not limited to, chickens, turkeys, pigeons, quail, parrots, macaws, dove, lovebirds, parakeets, flamingos, eagles, hawks, falcons, condor, ostriches, peacocks, ducks, swan, and rock Cornish game hens. As used herein, the term "fowl" includes birds used as food for humans, including, for example, chicken, turkeys, squab, quail, dove, ostriches, ducks, and rock cornish game hens.

A variety of bioactive glasses are known in the art. These include bioactive glasses such as BIOGLASS and its formulations. Bioactive glasses include, for example, those taught in U.S. Pat. Nos. 3,981,736; 4,131,597; 4,309,488; 4,613,516; 4,478,904; 4,676,796; 4,775,646; 4,851,046; 5,068,122; 5,074,916; 5,420,081; 5,429,996; 5,468,544; 5,458,636; 5,480,438; 5,486,598; 5,527,836; 5,554,501; 5,573,934; 5,605,713; 5,629,186; 5,643,789; 5,645,934; 5,676,720; 5,698,019; 5,721,049; 5,735,942; 5,762,950; 5,830,480; 5,834,008; 5,840,290; 5,861,176; 5,871,777; 5,874,101; 5,879,109; 5,891,233; 5,934,287; 5,964,745; 5,977,204; 5,981,412; 5,972,384; 6,010,713; 6,017,496; 6,027,742; and 6,190,643. Each of these patents is hereby incorporated by reference in their entireties.

In one embodiment, the bioactive glass material used according to the subject invention has a composition comprising (by percent weight) of 0–70% $SiO_2$, 0–40% $CaO$, 0–40% $Na_2O$, 0–40% $K_2O$, and 0–20% $P_2O_5$. An exemplary composition of bioactive glass has a composition comprising (by percent weight) of 40–60% $SiO_2$, 10–30% $CaO$, 10–35% $Na_2O$, 2–8% $P_2O_5$, 0–25% $CaF_2$, and 0–10% $Ba_2O_3$. Another embodiment envisions the bioactive glass formulation to be (by percent weight) 45% $SiO_2$, 24.5% $CaO$, 24.5% $Na_2O$, and 6% $P_2O_5$. Another embodiment envisions the bioactive glass formulation to be (by percent weight) 45% $SiO_2$, 35% $CaO$, 15% $K_2O$ and 5% $P_2O_5$. Any of the bioactive glass formulations can, optionally contain minor elements such as $MgO$, $ZnO$, $B_2O_3$, and $MnO$ at a concentration of 0–5%. Methods of making a powder of bioactive glass are well known to those skilled in the art and include, for example grinding or pulverizing glass particles into a fine powder. In a preferred embodiment, the average particle size of the powder is less than about 100 μm. In further embodiments, the average particle size is less than 50 μm, or even less than 20 μm.

The term "average particle size" means that 50% of the number of particles have a size less than or equal to the value mentioned (e.g. 100, μm) and that 50% of the number of particles have a size greater than or equal to said value.

According to a preferred embodiment, the average particle size is below 100 $\mu$m. The size of the individual particles may vary in a range extending from a value below 1 $\mu$m up to about 500 $\mu$m.

As a nutritional or dietary supplement, the powdered bioactive glass may be formulated in oral solid dosage form for example a tablet, capsule, lozenge, chewable tablet or bulk powder. The powdered bioactive glass may also be incorporated into known dietary supplements or medications typically provided in a solid form which are then consumed by an individual to be treated. These known dietary supplements include, and are not limited to, vitamins, herbal remedies, antacids, medications, such as aspirin, ibuprofen, antibiotics or other types of medicants which are swallowed in a solid form. The tablet, capsule or lozenge may contain suitable binders, lubricants, diluents, disintegrating agents, coloring agents, flavoring agents, flow-inducing agents and melting agents which are known to those skilled in the art. The solid dosage form may have a film coating to protect the ingredients from moisture, oxygen or light and to mask any undesirable taste or appearance. Suitable coating agents include cellulose, hydroxypropylmethylcellulose, cellulose phthalate, methacryulic copolymer and shellac. An enteric coating may be employed, as well as coloring agents for identification, and if desired, the solid form may be polished with a waxy composition, such as carnuba wax. Bulk powder forms of the bioactive glass may be added directly to foodstuffs or animal feeds.

The bioactive glass formulation may also be in a liquid dosage form which includes an emulsion and suspension. The liquid dosage form may contain, for example, suitable solvents, preservatives, emulsifying agents, suspending agents, diluents, sweeteners, melting agents, and coloring and flavoring agents, which are known to skilled in the art. Powdered bioactive glass may be added to liquid vitamin formulations, electrolyte containing drinks (such as sports drinks or pediatric electrolyte solutions), or any other liquid or beverage typically taken by the treated individual (see, for example, U.S. Pat. No. 6,036,984, hereby incorporated by reference in its entirety).

Powdered bioactive glass may be used to supplement feeds or foodstuffs consumed by the individual which is to benefit from the treatments contemplated by this invention. Powdered bioactive glass may be mixed into any feeds provided to domesticated animals. Alternatively, powdered bioactive glass may be incorporated into foodstuffs provided to humans for consumption.

Any form of administration can be used. Oral administration is a preferred route of administration. However, a the skilled artisan would recognize, other acceptable routes for the administration of dietary supplements also exist. These routes include intraperitoneal, parenteral, enteral, intramuscular, and intraveneous administration or injection of liquid forms of the bioactive glass.

One embodiment of the invention contemplates methods of enhancing the growth rates and/or increasing the amount of food consumed by young animals comprising the administration of nutritional supplements comprising powdered bioactive glass. The bioactive glass may also be added to the feed or foodstuffs presented to the animal for consumption. Alternatively, the bioactive glass compositions may be administered intraperitoneally, parenterally, enterally, intramuscularly, and intraveneously.

Another embodiment of the invention contemplates methods of enhancing the growth rates of young poultry by the administration of nutritional supplements containing powdered bioactive glass. This would include, for example, feeding the nutritional supplement of the subject invention to chickens during the first 8–10 weeks of life. The bioactive glass maybe, for example, added to the water, feed or foodstuffs presented to the poultry for consumption. Another embodiment contemplates the strengthening of egg shells in laying poultry which comprises the administration of nutritional supplements or feeds comprising powdered bioactive glass to laying poultry.

Another embodiment of the invention contemplates a method of osteogenic stimulation in animals by administration of feeds, foodstuffs, liquids, and/or dietary/nutritional supplements comprising powdered bioactive glass or the administration of feeds. Bioactive glass compositions may also be added to the feed or foodstuffs presented to the animal for consumption. Alternatively, the bioactive glass compositions may be administered intraperitoneally, parenterally, enterally, intramuscularly, and intraveneously.

Another embodiment of the invention is drawn to methods of strengthening the skeletal structure of an animal comprising the administration of feeds, foodstuffs, liquids, or dietary supplements comprising powdered bioactive glass to a animal. This invention also contemplates novel methods for treating osteoporosis in humans and, more particularly, involves the administration of feeds, foodstuffs, liquids, andor dietary/nutritional supplements comprising powdered bioactive glass. Powdered bioactive glass may be incorporated into food or beverages consumed by the treated individual.

A further embodiment contemplates methods of treating broken bones, non-unions, periodontal lesions, mandible resorption, and orthodontic lesions by the administration of feeds, water, foodstuffs, or dietary supplements comprising powdered bioactive glass.

The methods disclosed herein also contemplate methods of increasing food intake in animals comprising the administration of feeds, foodstuffs, or dietary supplements which comprise powdered bioactive glass to animals. The administration of compositions comprising bioactive glass increases the mean consumption of food by the treated individuals. As noted above, in one embodiment the bioactive glass comprises (by percent weight) 0–70% $SiO_2$, 0–40% CaO, 0–40% $Na_2O$, 0–40% $K_2O$, and 0–20% $P_2O_5$, or 40–70% $SiO_2$, 10–40% CaO, 0–40% $Na_2O$, 0–40% $K_2O$ and 2–20% $P_2O_5$. The composition may optionally contain minor elements such as $B_2O_3$, ZnO, MnO, and MgO from 0% to 5%. In another embodiment, the bioactive glass comprises (by percent weight) 40–60% $SiO_2$, 10–30% CaO, 10–35% $Na_2O$, 2–8% $P_2O_5$, 0–25% $CaF_2$, and 0–10% $Ba_2O_3$. The composition may optionally contain minor amounts of compounds such as $B_2O_3$, ZnO, MuO, and MgO from 0% to 5%. In another embodiment the bioactive glass comprises (by percent weight) 45% $SiO_2$, 24.5% CaO, 24.5% $Na_2O$, and 6% $P_2O_5$. In another embodiment the bioactive glass comprises 45% $SiO_2$, 35% CaO, 15% $K_2O$, and 5% $P_2O_5$.

Following are examples which illustrate procedures for practicing the invention. These examples should not be construed as limiting. All percentages are by weight and all solvent mixture proportions are by volume unless otherwise noted.

EXAMPLE 1

Study to Evaluate Biological Effects of Bioglass

Methods. Homogeneity analyses indicated that the test material was homogeneously mixed; the coefficient of variation was within 5%. The overall mean percent of target (pre- and postdose samples) for 12.5, 75, and 500 mg/mL formulations were 91.5, 96.3, and 102, respectively. Pre-and postdose analyses indicated that the formulations were stable during the dosing period; pre-and post-dose variation was <5%. BIOGLASS was administered by oral gavage to Crl:CD®BR rats for at least 13 weeks at a dose level of 50, 300, or 2000 mg/kg/day. No certain toxic effects were noted. The day of initiation of treatment is "Day 1, Week 1." Body weight data are entered at the start of a study week (e.g., a body weight recorded on Day 1 is considered a Week 1 body weight, a body weight recorded on Day 8 is considered a Week 2 body weight). The comment "SPILLED" on individual food consumption data tables indicates that food consumption was not recorded due to spillage or contamination during the interval.

Four groups of Crl:CD®(SD)BR rats from Charles River Laboratories, Inc. were exposed to BIOGLASS or the control material (Satin Sweet 65% Maltose Corn Syrup) according to the following schedule of dose levels (Table 1):

TABLE 1

| Group | Number of Animals | | Dose Level | Concentration |
|---|---|---|---|---|
| | Male | Female | mg/kg/day | mg/mL |
| 1 (Control) | 10 | 10 | 0.0 | 0.0 |
| 2 (Low) | 10 | 10 | 50.0 | 12.5 |
| 3 (Mid) | 10 | 10 | 300.0 | 75.0 |
| 4 (High) | 10 | 10 | 2000.0 | 500.0 |

Exposure, by one-daily oral gavage, continued for at least 13 weeks, after which all surviving animals were sacrificed for pathologic evaluation.

All animals were weighed once prior to the initiation of treatment, on the first day of treatment, and weekly thereafter. Blood samples for clinical chemistry and hematology were collected from all animals at terminal sacrifice, following an overnight fast during which water was available. Blood collections were made by puncture of the orbital plexus using carbon dioxide (mixed with oxygen) for anesthesia. All surviving animals were sacrificed, at the appropriate time, by exsanguination under barbiturate anesthesia and subjected to a necropsy examination. Clinical observations were reviewed at necropsy, and all grossly observed abnormalities were entered directly into the computerized data collection system. Adrenals, liver, brain, pituitary, thyroid with parathyroids, kidneys, testes with epididymides, ovaries, and heart were weighed from each animal at terminal sacrifice. Paired organs were weighed together; pituitary and thyroids with parathyroids were weighed after fixation. After gross examination, appropriate samples of each of the following organs/tissues were preserved in 10% neutral-buffered formalin:

| | |
|---|---|
| adrenals | pancreas |
| aorta | pituitary |
| brain | *prostate |
| cecum | rectum |
| *cervix | *salivary glands (mandibular) |
| colon | seminal vesicles |
| duodenum | sciatic nerve |
| esophagus | *skin |
| *exorbital lacrimal gland | *skeletal muscle (thigh) |
| *eyes | *spinal cord (cervical, thoracic, lumbar) |

-continued

| | |
|---|---|
| *femur (articular surface of the distal end) | spleen |
| heart | Sternum with marrow |
| ileum | stomach |
| jejunum | testes with epididymides |
| kidneys | thymus |
| lesions | thyroid with parathyroids |
| liver | trachea |
| lungs | urinary bladder |
| lymph node (mesenteric) | uterus |
| mammary gland (females only) | *vagina |
| ovaries | |

All bony tissues were decalcified prior to processing. Tissues to be examined histologically were embedded in paraffin, sectioned at approximately $5\mu$, and stained with hematoxylin and eosin (H&E). Histologic evaluations were conducted on all tissues from the above list, except for those marked with an asterisk (*), from all animals of Groups 1 and 4 sacrificed after 13 weeks of exposure and from any animals dying during the course of the study. In addition, gross findings were examined histologically from all remaining animals of Groups 2 and 3. All histologic findings were entered directly into the computerized data capture system. Most lesions were graded as to relative severity or degree of involvement (1=minimal, 2=slight, 3=moderate, 4=moderately severe, 5=severe). The grades are subjective, comparative evaluations, based on morphology alone, and are not intended by themselves to imply any degree of functional impairment.

Survival. One 2000 mg/kg/day male, No. B06231, died during Week 11 from causes related to introduction of foreign material into the lungs during the gavage procedure; all other animals survived to the schedule sacrifice.

Clinical Observations. Alopecia and sores/scabs occurred sporadically and were of the type commonly seen in this species at this laboratory.

Ophthalmic Examinations. Ophthalmoscopic evaluations were performed once prior to initiation of dosing and during Week 13. The pupils were dilated with 1% MYDRIACYL and examined using indirect ophthalmoscopy. Rats examined prior to initiation of dosing that exhibited ophthalmoscopic lesions were excluded from study consideration. The eyes of the rats assigned to study were normal or had variations that are considered to be normal findings when examined prior to the initiation of dosing and during the course of the study. No ophthalmoscopic abnormalities were detected during the course of the study.

Body Weights. Mean body weight data are presented in FIGS. 1A–1B.

Figure 2A:
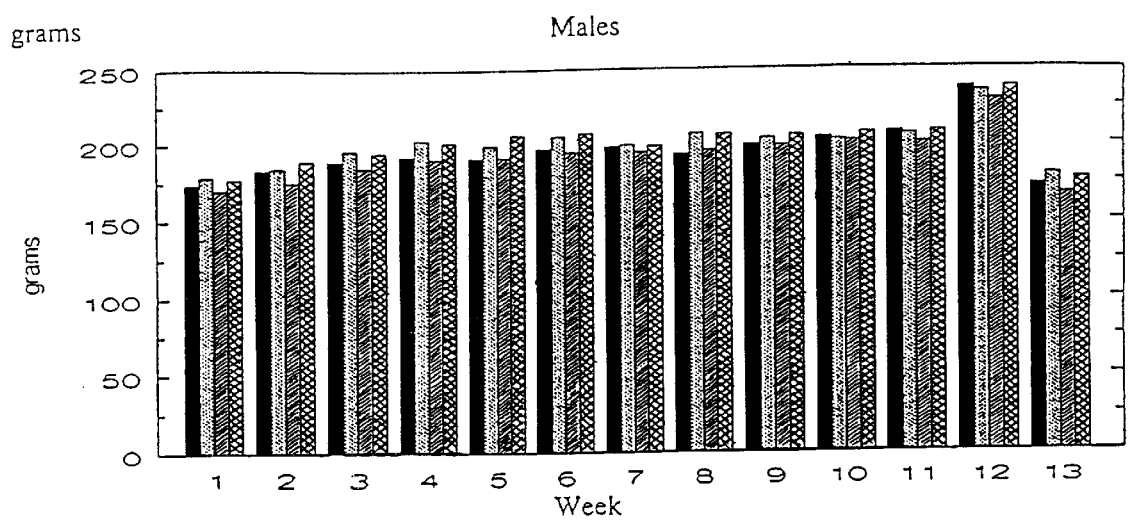
Figure 2B:
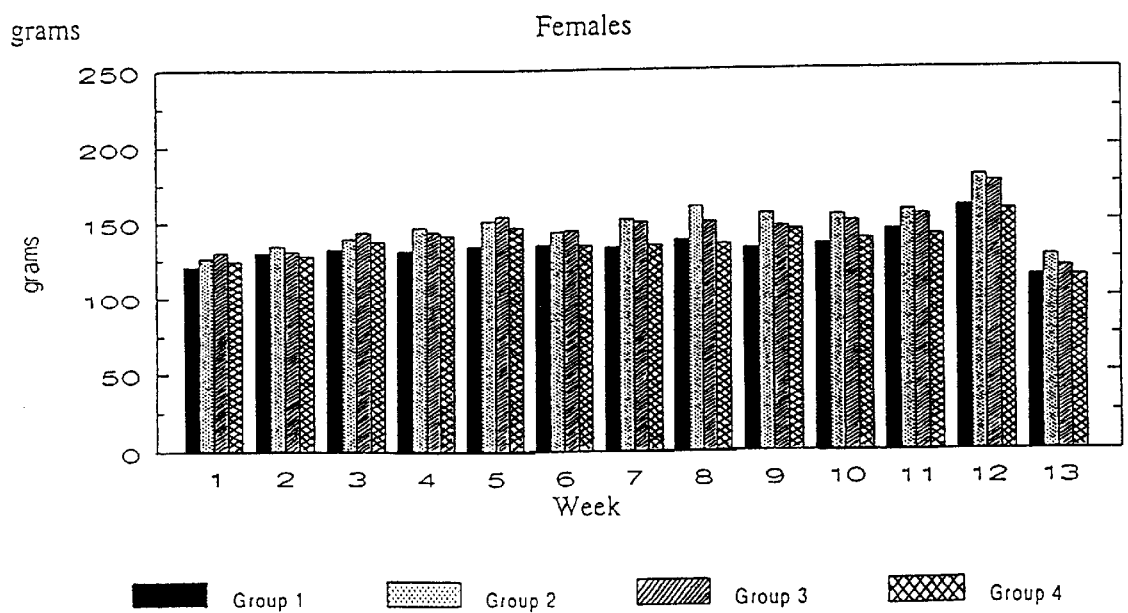

Food Consumption. Mean food consumption is depicted graphically in FIGS. 2A–2B. There were no significant differences in mean food consumption values between the control and any of the treated groups at any interval in either sex. The two sexes were always different at all intervals ($p \leq 0.000$).

Clinical Pathology. Mean hematology, coagulation, and serum chemistry values were evaluated during the course of the study. Statistically significant findings are presented in Table 2. The significant changes in the hematology and chemistry data are not attributed to the administration of BIOGLASS due to the low magnitude of the changes and, in some cases, the lack of a dose response. The urinalysis results were generally unremarkable and similar among the groups, with the exception that the pH readings were more alkaline in the 2000 mg/kg/day rats.

TABLE 2

Statistically Significant Findings - Clinical Pathology Data

|  |  | Males | | | Females | | |
| --- | --- | --- | --- | --- | --- | --- | --- |
| Parameter | Group mg/kg/day: | 2 50 | 3 300 | 4 2000 | 2 50 | 3 300 | 4 2000 |
| hemoglobin |  |  |  |  |  |  | 1 |
| hematocrit |  | 1 |  |  |  |  | 1 |
| total protein |  | 1 |  | 1 | 1 | 1 | 1 |
| albumin |  |  |  | 1 | 1 | 1 | 1 |
| globulin |  |  |  |  |  |  | 1 |
| albumin/globulin ratio |  |  |  |  |  | 1 | 1 |
| calcium |  |  |  |  |  | 1 | 1 |

Key: 1 = Significantly decreased, p ≦ 0.05.

Anatomic Pathology. Gross pathology findings revealed abnormalities that were few in number and randomly distributed. The abnormalities bore no relationship to dose, and were of the kinds commonly encountered in rats of this strain and age. There were significant sex and treatment effects in the mean kidney and thyroid absolute, organ-to-body, and organ-to-brain weight data and in the liver-and pituitary-to-body weight data. One-way ANOVA by sex on these parameters is presented in Table 3.

TABLE 3

Statistically Significant Findings - Organ Weight Data

|  |  | Males | | | Females | | |
| --- | --- | --- | --- | --- | --- | --- | --- |
| Parameter | Group mg/kg/day: | 2 50 | 3 300 | 4 2000 | 2 50 | 3 300 | 4 2000 |
| Thyroid/parathyroid absolute weight |  | 1 |  | 1 |  |  | 1 |
| thyroid/parathyroid-to-body weight % |  | 1 |  | 1 |  |  | 1 |
| thyroid/parathyroid-to-brain weight % |  | 1 |  | 1 |  |  | 1 |
| kidney-to-body weight % |  |  |  |  |  | 1 | 1 |
| liver-to-body weight % |  |  |  |  | 1 | 1 |  |
| pituitary-to-body weight % |  |  |  |  |  | 1 |  |
| kidney-to-brain weight ratio |  |  |  |  |  |  | 1 |

Key: −1 = Significantly decreased, p ≦ 0.05. 1 Significantly increased, p ≦ 0.05.

EXAMPLE 2

Effect of Bioactive Material on Mean Body Weight

Orally administered powdered bioactive glass caused rats to increase their weight throughout the study. The weight gain data clearly shows a trend for increased weight gain over controls for both male and female rats through 14 weeks. See FIGS. 1A–1B and 2A–2B. In a preferred embodiment, 50 mg/kg of BIOGLASS is consumed. A person skilled in the art could readily apply these results to other animals.

It should be understood that the examples and embodiments described herein are for illustrative purposes only and that various modifications or changes in light thereof will be suggested to persons skilled in the art and are to be included within the spirit and purview of this application.

We claim:

1. A method for improving nutrition in an animal wherein said method comprises administering to said animal a nutritional supplement comprising a bioactive glass, wherein the bioactive glass comprises components (by percent weight) 40–70% $SiO_2$, 10–40% CaO, 0–40% $Na_2$), 0–40% $K_2O$ and 2–20% $P_2O_5$.

2. The method, according to claim 1, wherein said bioactive glass is powdered.

3. The method, according to claim 1, wherein said bioactive glass further comprises 0–5% by weight of minor components selected from the group consisting of $B_2O_3$, ZnO, MnO and MgO.

4. The method, according to claim 3, wherein said bioactive glass comprises (by percent weight): 40–60% $SiO_2$, 10–30% CaO, 10–35% $Na_2O$, 2–8% $P_2O_5$, 0–25% $CaF_2$, and 0–10% $Ba_2O_3$.

5. The method, according to claim 3, wherein said bioactive glass comprises (by percent weight): 45% $SiO_2$, 24.5% CaO, 24.5% $Na_2O$, and 6% $P_2O_5$.

6. The method, according to claim 3, wherein said bioactive glass comprises (by percent weight): 45% $SiO_2$, 35% CaO, 15% $K_2O$, and 5% $P_2O_5$.

7. The method, according to claim 1, wherein said nutritional supplement is formulated into a composition selected from the group consisting of: liquids, tablets, capsules, lozenges, chewable tablets and bulk powders.

8. The method, according to claim 1, which is applied to an animal selected from the group consisting of mammals, reptiles, and avians.

9. The method, according to claim 7, which is applied to a human.

10. The method, according to claim 1, which is used to enhance the growth rate of an animal.

11. The method, according to claim 10, wherein said nutritional supplement is administered to a fowl during the first 10 weeks of life.

12. The method, according to claim 1, wherein said nutritional supplement is administered to an avian or reptile to increase the structural strength of egg shells produced by said avian or reptile.

13. The method, according to claim 12, wherein said avian is a chicken.

14. The method, according to claim 1, wherein said nutritional supplement is administered to an animal in order to achieve one or more of the group consisting of: enhance osteogenic stimulation, treat broken bones or non-unions, and strengthen skeletal structure.

15. The method, according to claim 1, which is used to treat one or more of the following: osteoporosis, periodontal lesions, mandible resorption, and orthodontic lesions.

* * * * *

UNITED STATES PATENT AND TRADEMARK OFFICE
CERTIFICATE OF CORRECTION

PATENT NO.      : 6,495,168 B2
DATED           : December 17, 2002
INVENTOR(S)     : West et al.

Figure 1B:
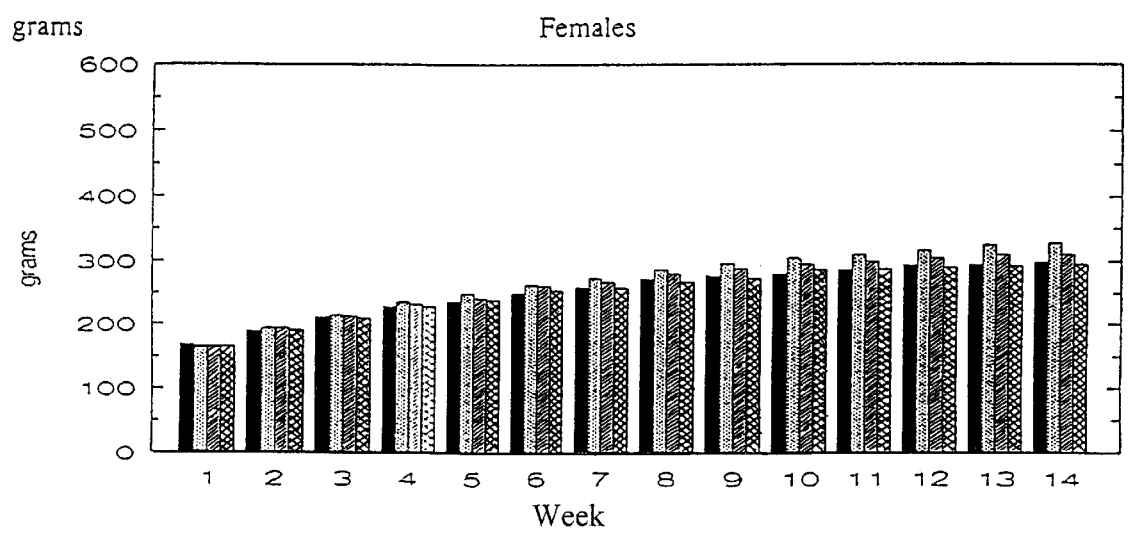
FIG. 1B depicts the weights of female animals.

It is certified that error appears in the above-identified patent and that said Letters Patent is hereby corrected as shown below:

Column 3,
Line 64, "FIGS. 1A-2B" should read -- FIGS. 1A-1B --

Column 6,
Line 26, "liquids, andor dietary/nutritional" should read -- liquids, and/or dietary/nutritional --

Column 10,
Line 11, "0-40% Na$_2$)," should read -- 0-40% Na$_2$O, --

Signed and Sealed this

Second Day of December, 2003

JAMES E. ROGAN
*Director of the United States Patent and Trademark Office*